(12) United States Patent
Rajkotia et al.

(10) Patent No.: US 7,263,359 B2
(45) Date of Patent: Aug. 28, 2007

(54) HANDOFF MECHANISM FOR CDMA WIRELESS NETWORK USING DYNAMICALLY SCALABLE TRAFFIC CHANNELS

(75) Inventors: Purva R. Rajkotia, Plano, TX (US); Chanakya Bandyopadhyay, Richardson, TX (US); Sanjaykumar Kodali, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 54 days.

(21) Appl. No.: 11/177,180

(22) Filed: Jul. 8, 2005

(65) Prior Publication Data

US 2006/0166671 A1 Jul. 27, 2006

Related U.S. Application Data (60) Provisional application No. 60/645,660, filed on Jan. 21, 2005, provisional application No. 60/645,836, filed on Jan. 21, 2005, provisional application No. 60/645,659, filed on Jan. 21, 2005.

(51) Int. Cl.
*H04Q 7/20* (2006.01)

(52) U.S. Cl. ............... 455/437; 455/436; 455/440; 370/331; 370/334

(58) Field of Classification Search ............. 455/437, 455/436, 440; 370/334, 331
See application file for complete search history.

(56) References Cited

U.S. PATENT DOCUMENTS

| | | | |
|---|---|---|---|
| 6,438,381 B1* | 8/2002 | Alberth et al. ............ 455/456.5 |
| 2001/0006514 A1* | 7/2001 | Park ............................ 370/331 |
| 2003/0148765 A1* | 8/2003 | Ma et al. ..................... 455/438 |
| 2004/0157609 A1* | 8/2004 | Jalloul et al. ............... 455/442 |
| 2005/0070593 A1* | 3/2005 | Soni et al. ................... 514/423 |
| 2006/0023775 A1* | 2/2006 | Rimini et al. ............... 375/150 |

* cited by examiner

*Primary Examiner*—Danh Le (57) ABSTRACT

A handoff mechanism for a mobile station and wireless network preferably operating in a ZxEV-DV mode, using scalable traffic channels where Z is a multiple of a 1xEV-DV channel, including a distance-based handoff. The disclosed handoff mechanism can be used in conventional wireless telecommunications systems.

19 Claims, 5 Drawing Sheets

HANDOFF MECHANISM FOR CDMA WIRELESS NETWORK USING DYNAMICALLY SCALABLE TRAFFIC CHANNELS

CROSS-REFERENCE TO RELATED APPLICATION AND CLAIM OF PRIORITY

The present invention is related to that disclosed in U.S. Provisional Patent No. 60/645,660, filed Jan. 21, 2005, entitled "Handoff Mechanism for CDMA Wireless Network Using Dynamically Scalable Traffic Channels". U.S. Provisional Patent No. 60/645,660 is assigned to the assignee of the present application. The subject matter disclosed in U.S. Provisional Patent No. 60/645,660 is hereby incorporated by reference into the present disclosure as if fully set forth herein. The present application hereby claims priority under 35 U.S.C. §119 (e) to U.S. Provisional Patent No. 60/645,660. The present application also claims priority to U.S. Provisional Patent Applications No. 60/645,836, filed Jan. 21, 2005, and No. 60/645,659, filed Jan. 21, 2005, both of which are hereby incorporated by reference.

TECHNICAL FIELD OF THE INVENTION

The present invention relates generally to wireless networks and, more specifically, to a mechanism for handing off mobile stations between base stations having scalable-bandwidth traffic channels.

BACKGROUND OF THE INVENTION

Wireless communications systems, including cellular phones, paging devices, personal communication services (PCS) systems, and wireless data networks, have become ubiquitous in society. To attract new customers, wireless service providers continually seek to improve wireless services cheaper and better, such as by implementing new technologies that reduce infrastructure costs and operating costs, increase handset battery lifetime, and improve quality of service (e.g., signal reception).

Code division multiple access (CDMA) is a very common and popular platform for providing wireless service. Wireless service providers use CDMA technology to provide both voice and data services to subscribers. The latest versions of CMDA (e.g., IS-2000, 1×EV-DV/DO, and WCDMA) provide a range of improved services to subscribers, including high-speed data connections to support applications such as e-mail, web browsing, and the like.

However, like other wireless technologies, CDMA provides a strict allocation of frequencies and bandwidth to each user mobile station. Wireless network operators seeking additional performance enhancements have requested a more flexible capability that will support CDMA service beyond the existing 1.25 MHz spectrum allocation.

To meet with the requests of wireless network operators, the Applicants have proposed a wireless network based on the 1×EV-DV standard in which traffic channel bandwidth may be allocated in a dynamic and scalable manner. The scalable traffic channels are a multiple, Z, of a 1×EV-DV channel, so that the wireless network is generically referred to herein as a "Z×EV-DV wireless network". However, the introduction of dynamically scalable traffic channels in a Z×EV-DV wireless network introduces complications in the conventional handoff mechanism used in 1×EV-DV wireless networks.

Therefore, there is a need in the art for improved CDMA wireless network. In particular, there is a need for an improved handoff mechanism for use in a CDMA wireless network that uses scalable-bandwidth traffic channels.

SUMMARY OF THE INVENTION

The present invention provides a handoff mechanism for the mobile station preferably operating in a Z×EV-DV mode, using scalable traffic channels where Z is a multiple of a 1×EV-DV channel, including a distance-based handoff. The disclosed handoff mechanism can be used in conventional wireless telecommunications systems.

To address the above-discussed deficiencies of the prior art, it is a primary object of the present invention to provide a CDMA wireless network comprising a plurality of base stations capable of communicating with a plurality of mobile stations in a coverage area of the CDMA wireless network. According to an advantageous embodiment of the present invention, a mobile station is capable of handing off the pilot signals from a first base station and a second base station according to at least one of: 1) a dual antenna-based handoff mechanism, wherein the mobile station uses a first antenna for traffic channel signals and a second antenna for a pilot channel signals and wherein the mobile station initiates a handoff operation whenever the pilot strength of a neighboring base station or a neighboring sector of the same base station goes above the T_ADD/T_COMP threshold; and 2) a distance measurement-based handoff mechanism, wherein the mobile station determines the distances to each of a plurality of base stations from which the mobile station receives a pilot signal and wherein the mobile station adds a pilot signal from a first base station to the active set when the distance to the first base station is less than a DIST_ADD threshold and the mobile station drops a pilot signal from the first base station from the active set whenever the distance to the first base station exceeds a DIST_DROP threshold.

It is a further object of the present invention to provide a CDMA wireless network and corresponding mobile station comprising a plurality of base stations capable of communicating with a plurality of mobile stations in a coverage area of the CDMA wireless network, wherein a mobile station is capable of handing off the pilot signals from a first base station and a second base station, and wherein the mobile station is configured to determine the distance to the second base station; if the distance to the second base station is less than a first threshold, then sending a message to the first base station to add the second base station to an active list; and if the distance to the second base station is less greater than a second threshold for more than a specified amount of time, then sending a message to the first base station to remove the second base station from the active list.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
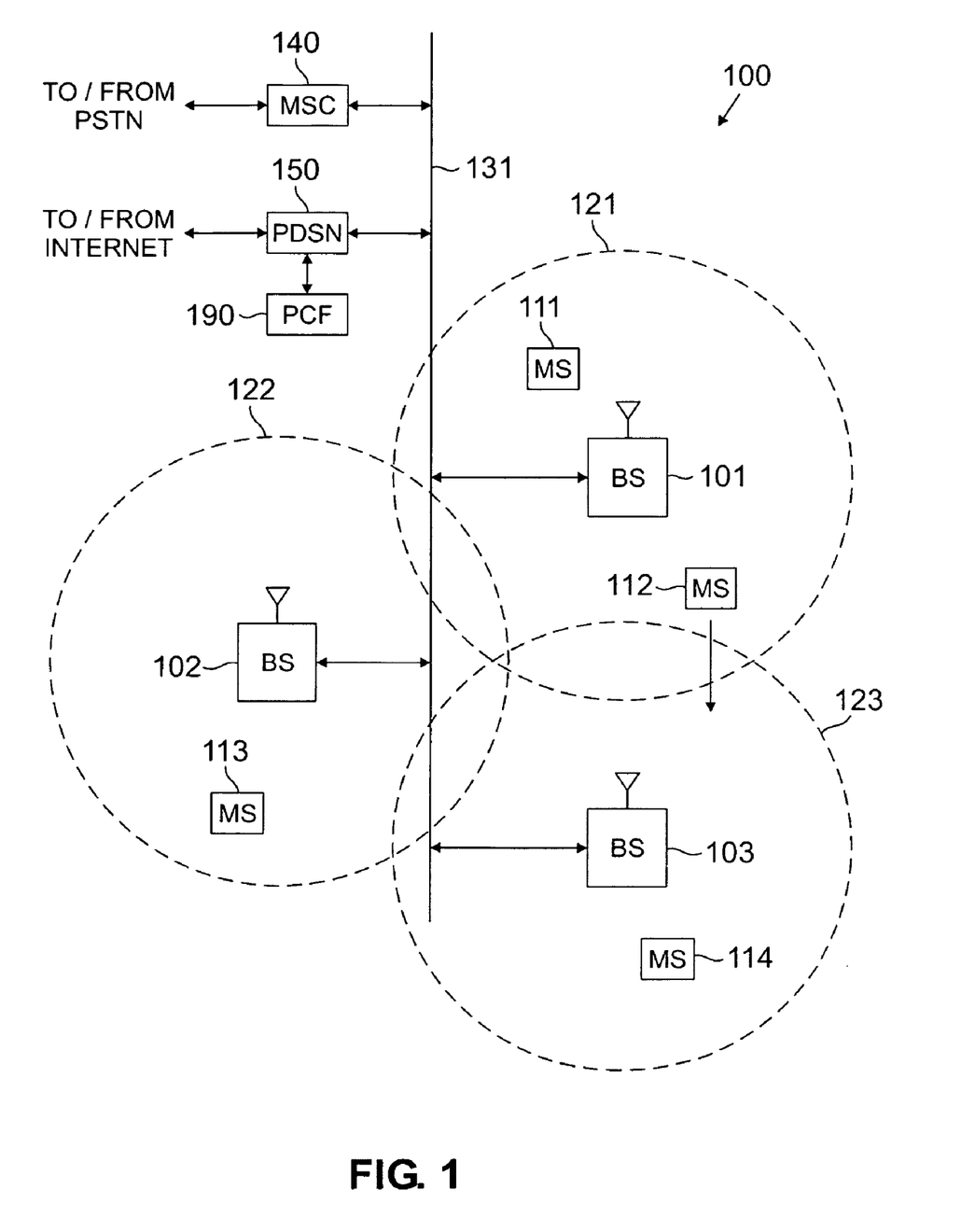
FIG. 1 illustrates an exemplary wireless network that performs handoffs between mobile stations using scalable-bandwidth traffic channels according to the principles of the present invention.
Figure 2:
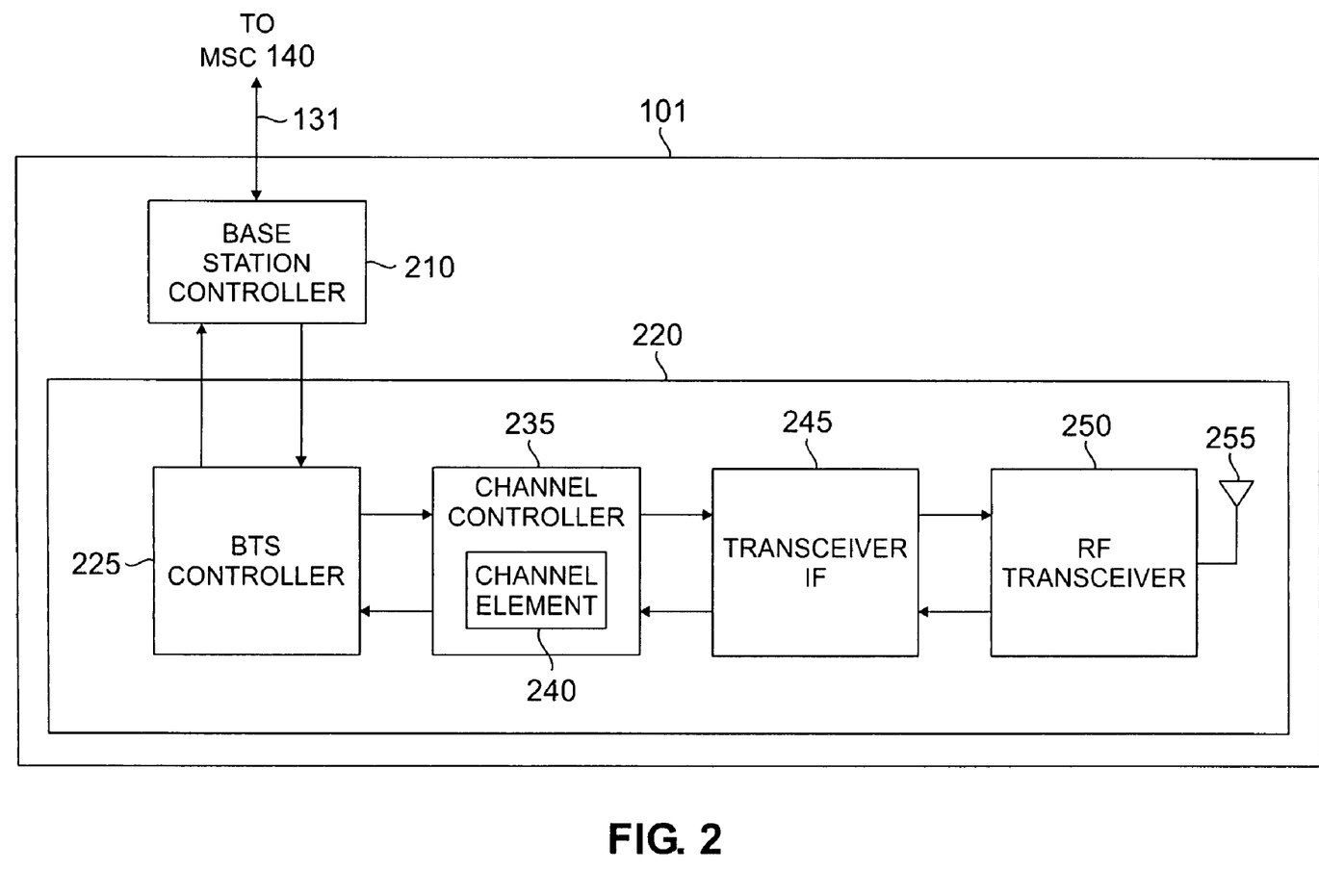
FIG. 2 illustrates an exemplary base station in greater detail according to an exemplary embodiment of the present invention.

FIGS. 1 through 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged CDMA wireless network.

FIG. 1 illustrates exemplary wireless network 100, which performs handoffs between mobile stations using scalable-bandwidth traffic channels according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In particular, base stations 101-103 communicate with mobile stations 111-114 over CDMA traffic channels having dynamically scalable bandwidth according to the ZxEV-DV standard. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. The BSC will typically include one or more processors, a memory, and other supporting hardware.

A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

FIG. 2 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Figure 3:
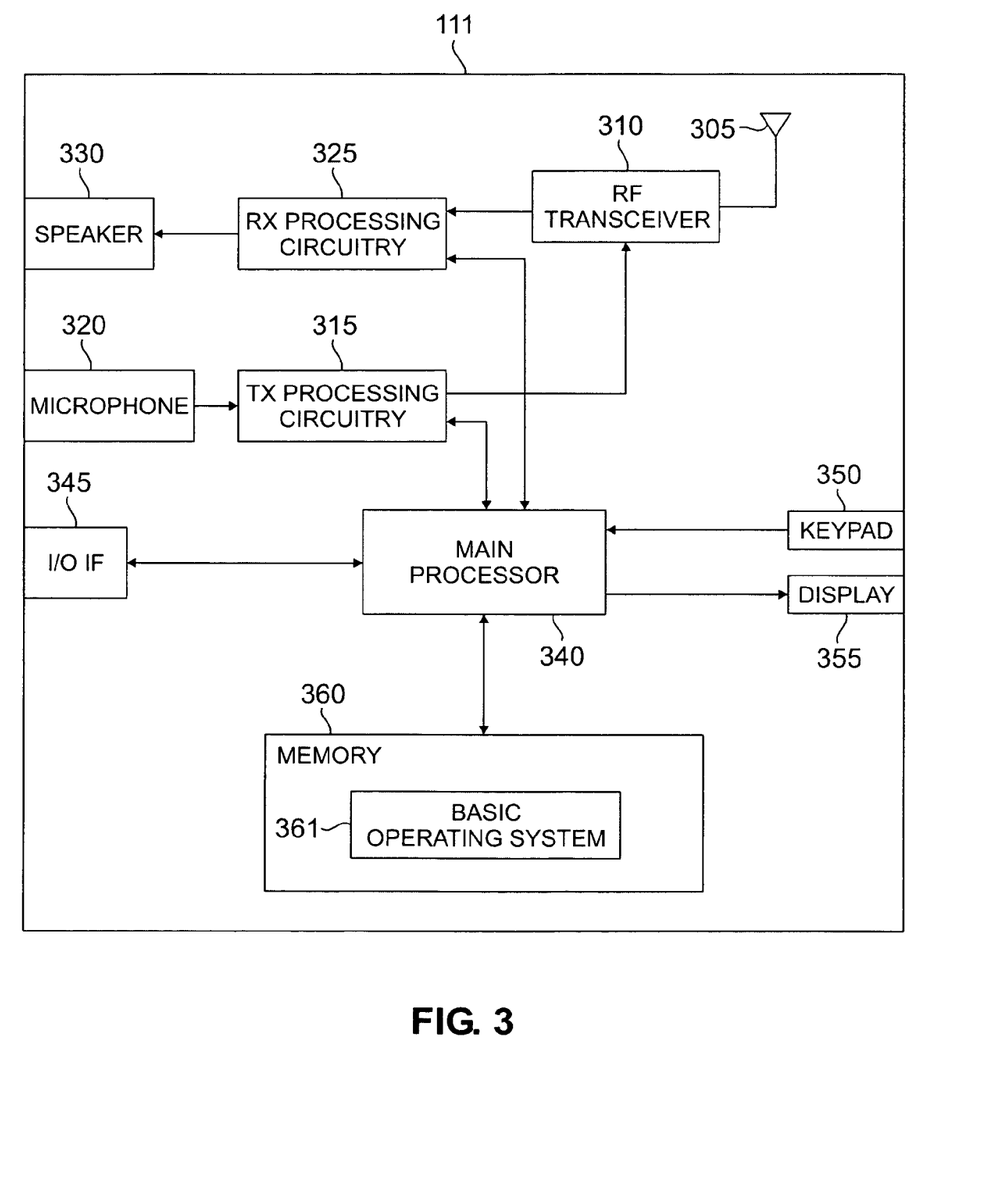
FIG. 3 illustrates a wireless mobile station according to an advantageous embodiment of the present invention.

FIG. 3 illustrates wireless mobile station 111 according to an advantageous embodiment of the present invention. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing). RF Transceiver 310 can include multiple physical transmitters, receivers, and/or transceivers.

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present invention, main processor 340 is a microprocessor or microcontroller. Memory 360 is coupled to main processor 340. According to an advantageous embodiment of the present invention, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

According to the principles of the present invention, wireless network 100 provides a mechanism for allocating bandwidth in a dynamic and scalable manner between base stations (e.g., BS 101 or one as shown in FIG. 2) and mobile stations (i.e., MS 111 or one as shown in FIG. 3). To achieve this, the present invention modifies conventional CDMA technology in the following manner. Signaling messages are modified to include new parameter fields that carry the bandwidth data, the band class number, and the separation between the contiguous bands of frequencies. This information may be transmitted in the base station in the overhead control messages in order to advertise the capability of the BS. The resulting network is a Z×EV-DV wireless network in which traffic channel bandwidth is a multiple Z of a 1×EV-DV traffic channel bandwidth, as also described in the related applications incorporated herein.

To support the scalable bandwidth traffic channels described above, the present invention also provides an improved handoff algorithm. The improved handoff algorithm provides the following kinds of handoff mechanisms: i) dual antenna-based handoff; and ii) distance measurement-based handoff. The dual antenna-based handoff is applicable to mobile stations that are equipped with two antennas for communicating in 1×EV-DV traffic channels. A first one of the two antennas is used for traffic channel frame sending and processing. The second antenna monitors pilot channels of all of the neighboring cell sites. A handoff operation is initiated whenever the pilot strength of a neighboring base station or a neighboring sector of the same base station goes above the T_ADD/T_COMP threshold. This handoff mechanism is similar to that in IS-2000, Release C.

In a distance measurement-based handoff scenario, each base station transmits in ENLUM message the following parameters for each neighbor base station: 1) NGHBR_LOC_IND; 2) NGHBR_LAT; and NGHBR_LONG. The NGHBR_LOC_IND parameter (or field) in the Neighbor Location Indicator. If the base station includes the NGHBR_LAT and NGHBR_LONG parameters in the ENLUM message, the base station shall set the NGHBR_LOC_IND parameter to Logic 1 (enabled). Otherwise, the base station shall set the NGHBR_LOC_IND parameter to Logic 0 (disabled).

The NGHBR_LAT parameter (or field) is the Neighbor Base Station Latitude. If the NGHR_LOC_IND parameter is equal to Logic 1, the base station set the NGHBR_LAT parameter to the mobile station latitude in units of 0.25 seconds, expressed as a 2 s-complement signed number with positive numbers signifying north latitudes. The base station sets this field to a value in the range −1296000 to 1296000 inclusive, corresponding to a range of −90 degrees to +90 degrees. Otherwise, the base station does not include this field.

The NGHBR_LONG parameter (or field) is the Neighbor Base Station Longitude. If the NGHBR_LOC_IND parameter is equal to Logic 1, the base station set the NGHBR_LONG parameter to the mobile station longitude in units of 0.25 second, expressed as a 2 s-complement signed number with positive numbers signifying east longitudes. The base station sets this field to a value in the range −2592000 to 2592000 inclusive, corresponding to a range of −180 degrees to +180 degrees. Otherwise, the base station does not include this field.

Each base station can determine NGHBR_LAT and NGHBR_LONG, in preferred embodiments, using common GPS technology built into the mobile stations, as well known to those of skill in the art. Of course, other known means for determining the physical location of each mobile station can be used. From the geographic coordinates of a mobile station and the geographic coordinates of a base station, the distance between them is easy calculated.

The present invention also modifies the Universal Handoff Direction message from the base station to include the following new parameters for distance measurement-based handoffs: 1) DIST_ADD; and 2) DIST_DROP. The DIST_ADD parameter is the Pilot Addition Distance threshold. This parameter is used by the mobile station to trigger the transfer of a pilot from the Neighbor Set or Remaining Set to the Candidate Set and to trigger the sending of the Pilot Strength Measurement Message (PSMM) or the Extended Pilot Strength Measurement Message initiating the handoff process. The DIST_DROP parameter is the Pilot drop Distance threshold. This parameter is used by mobile stations to start a handoff drop timer for pilots in the Active Set and the Candidate Set.

Preferably, each base station will have data for each neighboring base station, including location data and frequency/bandwidth allocation data.

Figure 4:
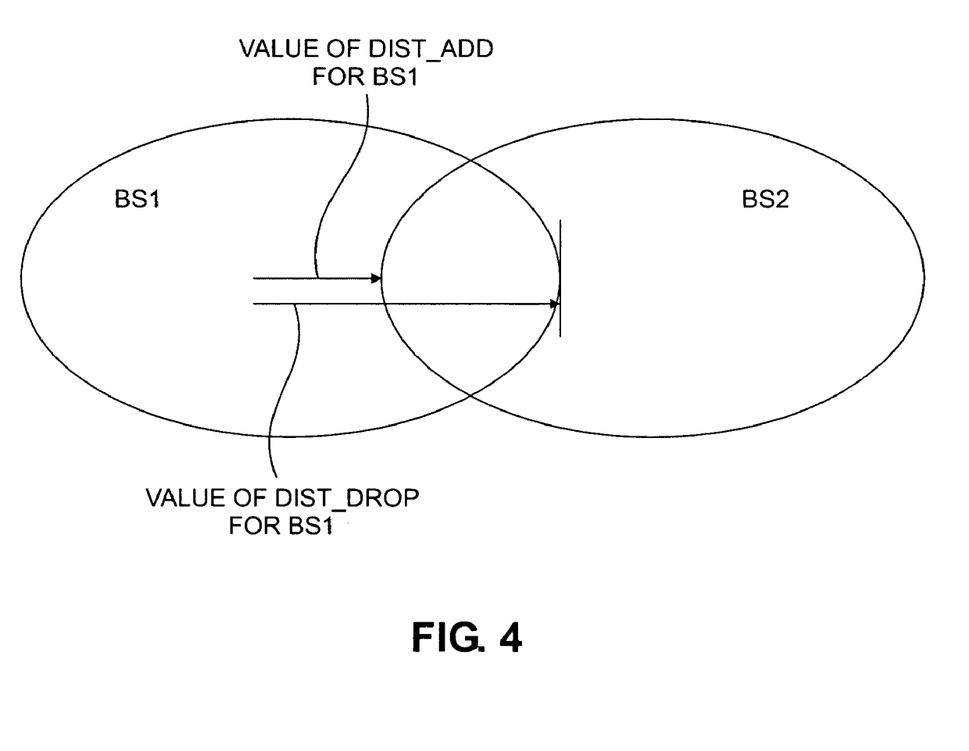
FIG. 4 illustrates the use of the DIST_ADD parameter and the DIST_DROP parameter according to the principles of the present invention.
Figure 5:
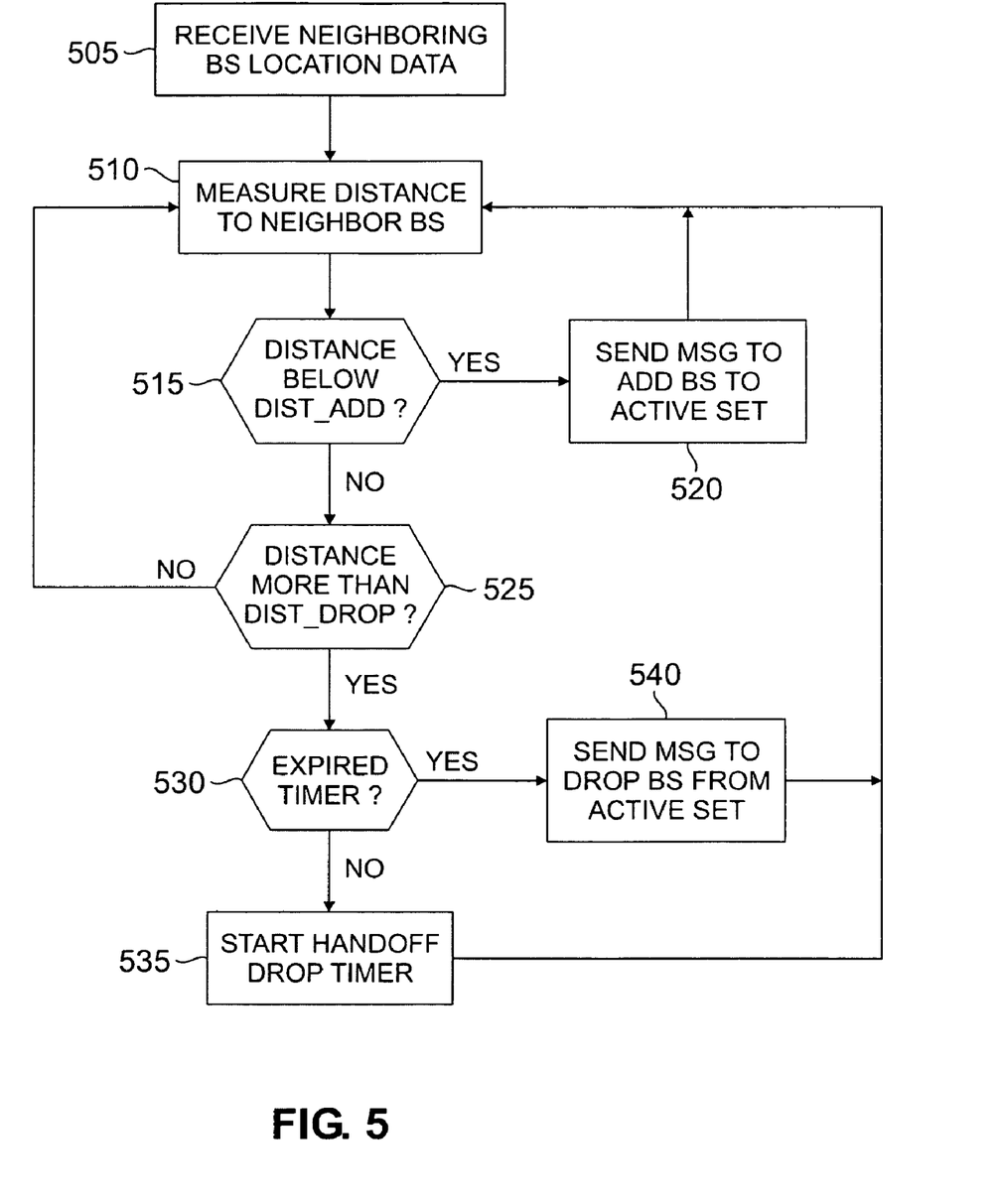
FIG. 5 illustrates a flowchart of a process in accordance with an exemplary embodiment.

FIG. 4 illustrates the use of the DIST_ADD parameter and the DIST_DROP parameter according to the principles of the present invention. FIG. 5 depicts a flowchart of a process in accordance with an exemplary embodiment. A mobile station working in a high-bandwidth traffic channel on base station BS2 receives location data for neighboring base stations, including neighboring base station BS1 (step 505).

The mobile station periodically measures the distance from itself to each of the neighboring base stations (step 510), including neighboring base station BS1. If the distance to a neighboring base station BS1 goes below the DIST_ADD threshold (step 515), the mobile sends the PSMM, to BS2, to add the neighboring base station BS1 to the active set (step 520). In this way, the active set will include all of the base stations within the DIST_ADD distance.

Similarly, if the distance to a neighboring base station BS1 becomes more than the DIST_DROP threshold (step 525), the will determine if a handoff drop timer has already expired (step 530), and will other wise start a handoff drop timer (step 535). When the mobile station again measures the distance to the target base station BS1 (returning to step 510), if the handoff timer has expired (step 530), and the distance is still greater than the DIST_DROP parameter, the mobile station sends the PSMM to drop the base station BS1 from the active set (step 540). In this way, if the distance to a neighboring base station exceeds DIST_DROP for a specified length of time, that BS is dropped from the active list.

The distance-based handoff procedure is particularly useful in a wireless system with scalable-bandwidth traffic channels. Because each base station in such a system can be transmitting a pilot channel on any number of frequencies, it is difficult and inefficient for a mobile station to continuously monitor other possible pilot channels and calculate pilot-channel power readings. Using the distance measurement-based handoff technique described herein, the active set will include only the nearby neighboring base stations. Further, when the procedure is begun, the base station preferably indicates to the mobile station the frequency/bandwidth allocation of the target base station. This eliminates what can otherwise be a need for multiple tunable receivers in the mobile station, allowing the mobile station to function using only a single receiver.

Although the present invention has been described with an exemplary embodiment, various changes and modifications may be suggested to one skilled in the art. It is intended that the present invention encompass such changes and modifications as fall within the scope of the appended claims.

What is claimed is:

1. A CDMA wireless network comprising:
a plurality of base stations capable of communicating with a plurality of mobile stations in a coverage area of the CDMA wireless network,
wherein a mobile station is capable of handing off the pilot signals from a first base station and a second base station according to at least one of: 1) a dual antenna-based handoff mechanism, wherein the mobile station uses a first antenna for traffic channel signals and a second antenna for a pilot channel signals and wherein the mobile station initiates a handoff operation whenever the pilot strength of a neighboring base station or a neighboring sector of the same base station goes above the T_ADD/T_COMP threshold; and 2) a distance measurement-based handoff mechanism,
wherein the mobile station determines the distances to each of a plurality of base stations from which the mobile station receives a pilot signal, and
wherein the mobile station adds a pilot signal from a first base station to the active set when the distance to the first base station is less than a DIST_ADD threshold and the mobile station drops a pilot signal from the first base station from the active set whenever the distance to the first base station exceeds a DIST_DROP threshold.

2. The CDMA wireless network as set forth in claim 1, wherein the first base station determines the geographic location of the mobile station according to GPS data.

3. The CDMA wireless network as set forth in claim 1, wherein the mobile station drops a pilot signal from the first base station from the active set whenever the distance to the first base station exceeds a DIST_DROP threshold at two different times determined by a countdown timer.

4. The CDMA wireless network as set forth in claim 1, wherein the mobile station has a single tunable receiver with dual antennas.

5. The CDMA wireless network as set forth in claim 2, wherein the CDMA wireless network has dynamically scalable traffic channels.

6. A CDMA wireless network comprising a plurality of base stations capable of communicating with a plurality of mobile stations in a coverage area of the CDMA wireless network, wherein a mobile station is capable of handing off the pilot signals from a first base station and a second base station, and wherein the mobile station is configured to:
determine the distance to the second base station;
if the distance to the second base station is less than a first threshold, then sending a message to the first base station to add the second base station to an active list; and
if the distance to the second base station is less greater than a second threshold for more than a specified amount of time, then sending a message to the first base station to remove the second base station from the active list.

7. The CDMA wireless network as set forth in claim 6, wherein the first base station determines the geographic location of the mobile station according to GPS data.

8. The CDMA wireless network as set forth in claim 6, wherein the first base station transmits the geographic location of the mobile station to the mobile station.

9. The CDMA wireless network as set forth in claim 6, wherein the specified amount of time is determined using a countdown timer.

10. The CDMA wireless network as set forth in claim 6, wherein the mobile station has a single tunable receiver with dual antennas.

11. The CDMA wireless network as set forth in claim 6, wherein the mobile station performs pilot signal strength evaluations only on base stations on the active list.

12. The CDMA wireless network as set forth in claim 6, wherein the CDMA wireless network has dynamically scalable traffic channels.

13. A mobile station capable of communicating with a plurality of base stations in a coverage area of a CDMA wireless network, wherein a mobile station is capable of handing off the pilot signals from a first base station and a second base station, and wherein the mobile station is configured to:
determine the distance to the second base station;
if the distance to the second base station is less than a first threshold, then sending a message to the first base station to add the second base station to an active list; and
if the distance to the second base station is less greater than a second threshold for more than a specified amount of time, then sending a message to the first base station to remove the second base station from the active list.

14. The mobile station as set forth in claim 13, wherein the mobile station transmits GPS data to the first base station.

15. The mobile station as set forth in claim 13, wherein the mobile station receives its geographic location from the first base station.

16. The mobile station as set forth in claim 13, wherein the specified amount of time is determined using a countdown timer.

17. The mobile station as set forth in claim 13, wherein the mobile station has a single tunable receiver with dual antennas.

18. The mobile station as set forth in claim 13, wherein the mobile station performs pilot signal strength evaluations only on base stations on the active list.

19. The mobile station as set forth in claim 13, wherein the mobile station is capable of communicating with dynamically scalable traffic channels.

* * * * *